Oct. 25, 1960 C. G. SVALA 2,958,077

MAGNETIC REGISTER CIRCUIT

Filed Jan. 14, 1957

INVENTOR
CARL GUNNAR SVALA
BY Hane and Nydick
ATTORNEYS

United States Patent Office 2,958,077

Patented Oct. 25, 1960

2,958,077

MAGNETIC REGISTER CIRCUIT

Carl Gunnar Svala, Alvsjo, Sweden, assignor to Telefonaktiebolaget L M Ericsson, Stockholm, Sweden, a corporation of Sweden Filed Jan. 14, 1957, Ser. No. 634,113

Claims priority, application Sweden Jan. 18, 1956

3 Claims. (Cl. 340—174)

Figure 1:
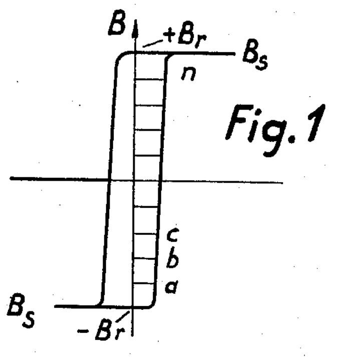

The present invention relates to circuit systems for reading the number of stored impulses in a magnetic register utilizing a magnetic material having specific remanence and saturating characteristics.

For certain applications within the field of automatic telephony impulse counters are used. As very many counters are required, it is desirable that they are as inexpensive as possible. The counters can be read from a central place, e.g. a marker and therefore no reading equipments are necessary in connection with the counters themselves. Magnetic pulse counters with saturable cores have proved to be suitable for replacing the usual relay and glow discharge tube registers as they are particularly simple as to the construction and very reliable. The entire register consists of only one coil having a saturable iron core and possibly a so called "quanting transformer" which insures that the impulses applied to the coil correspond to constant flux increments. The equipments for reading the impulses stored in the coils become a little more complicated, but as each reading equipment serves a great number of registers their cost is of no great account.

Magnetic registers of the above mentioned kind consisting of a coil having a saturable core of a material with a substantially rectangular hysteresis loop have been described in an article in Siemens Zeitschrift, vol. 26, No. 3, April 1952, page 140–144. As shown in this article, the inductance for such a coil is high until the magnetization attains the saturation value, whereupon it decreases to a very low value, which in the ideal case is zero. The time taken for re-magnetizing the core from the negative to the positive saturation value depends according to the article on the time integral for the voltage applied across the coil. If thus a constant voltage is applied to the coil a relatively insignificant current is flowing during a certain time T whereafter the current stepwise increases when the counter-electromotive voltage at the ensuing saturation suddenly decreases. Such a coil can be used as an impulse counter if the core is magnetized with voltage impulse corresponding to a constant time integral $\int vdt$, where $y$ is the instantaneous voltage and $\tau$ is the time. Each impulse applied to the coil is then bringing the magnetization of the core one step nearer the saturation value, and when so many impulses are supplied to the coil that their voltage integral corresponds to the value necessary for re-magnetizing, the inductance of the coil suddenly decreases and it is possible to read on an instrument such as an oscilloscope connected in series with the coil when the desired number of impulses are stored in the coil.

If an arbitrary number of impulses is to be stored in such a coil, e.g. the dial impulses in an automatic telephone system, it is necessary to proceed in another way to be able to read the number of stored impulses. In the above mentioned article two principally different methods have been described. According to one of them, further impulses are fed from the reading device to the coil until it attains the saturation value, and thus the number of stored impulses of course is obtained as the difference between the storing capacity of the coil and the number of impulses "filled on" at the reading. According to the other method impulses with opposite polarity are fed to the coil so that it is restored to its original magnetic state. The latter method is not so depending on smaller deviations of the values in the different coils, and thus it is more exact. In both cases the reading is effected by means of with-running counters indicating the number of impulses fed to the coils from the reading device.

For certain applications within the field of automatic telephone systems of the link type the reading time has to be reduced to a minimum as the whole operation of the marker has to be accomplished during the interval between the digits. Owing to this a high reading pulse frequency has to be chosen, at least about 400 cycles, which from another point of view is unfavourable. When decreasing the remagnetization time the characteristics of the material in question will deteriorate by increasing the coercive force, whereby the magnetizing current increases and therewith the ohmic voltage drops caused thereby, which has a disturbing influence on the value of the voltage integrals.

When a quick reading is desired it is advantageous to accomplish the reading by means of a continuous voltage instead of impulses. According to the invention this is accomplished by an equipment with by at least as many reading coils having cores of a material with definite remanence and saturation characteristics as the maximum number of impulses which can be stored. The coils are so dimensioned that they are entirely remagnetized for a voltage integral $$\int_0^\tau E.dt.\frac{m}{n}$$

where $E$ is the voltage of the impulses applied to the magnetic register, $\tau$ is their length and $m$ is the ordinal number of the coil in question, where $n \geq m \geq 1$. The register coil and the reading coils are connected for reading to a common direct current source for a period of time such that the core of the register coil has adopted one of two saturation values and the number reading coils are entirely re-magnetized during this time thereby indicating the number of stored impulses.

Figure 2:
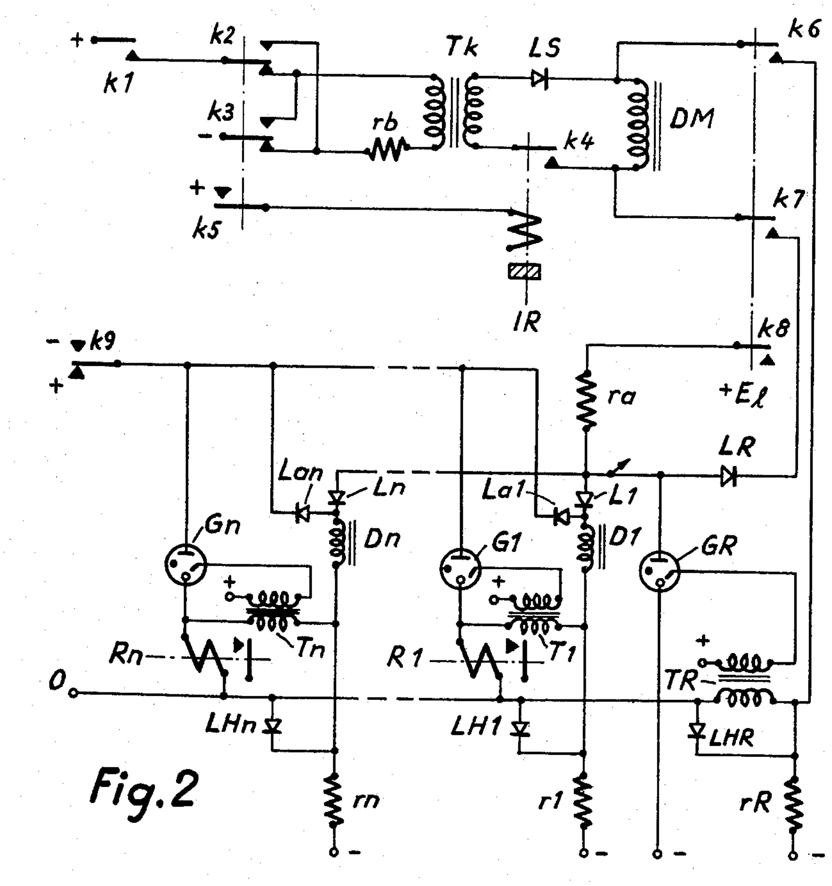

The invention is to be further described in connection with the attached figures, of which Fig. 1 shows the hysteresis loop of a material used in the arrangement according to the invention and Fig. 2 shows an arrangement according to the invention.

For further understanding of the function of the arrangement the lapse at pulsewise magnetization of a core with a rectangular hysteresis loop will first be briefly described.

Let it be assumed that the core is so magnetized that it has assumed the remanence —B*r*, which is practically the same as the negative value —B*s* of the saturation induction. In this state the inductance for negatively directed impulses is practically zero. If instead the core is magnetized in positive direction by an impulse, the amplitude and duration of which are such that the induction value *a* is attained the inductance of the coil will be high. When the impulse ceases a remanence is obtained corresponding to the induction of the point *a* and having substantially the same value. The next magnetizing impulse in the positive direction is starting from this remanence value and attains the point *b*, and in this way the magnetization is progressing in equal steps until the upper saturation value +B*s* is attained for the *n*th impulse. Of course, the inductance for the following positive impulses will be very low. Each step is determined only by the voltage time integral $\int_0^{\tau} Edt$, where E is the applied voltage and $\tau$ the impulse time.

If the number of impulses is lower than *n*, e.g. *d*, the reading must be effected by magnetizing the core either back to the negative saturation value —B*r* or up to the positive saturation value +B*r* of the induction.

Fig. 2 shows a register and the associated reading equipment according to the invention. The device from which the impulses to be registered are obtained contains a busy contact *k*1, which is closed when registration is to be effected. Further the device contains polarity changing contacts *k*2 and *k*3, generating the impulses to be registered. The polarity changing contacts *k*2 and *k*3 are via a current limiting resistance *rb* connected to the primary winding of a transformer T*k*. The transformer T*k* insures that the impulses obtained from the polarity changing contacts have a voltage integral $\int Edt$, which is constant. This is obtained by manufacturing the core of the transformer of a material having the hysteresis loop shown in Fig. 1, the applied impulses being strong enough for re-magnetizing the core from one of the saturation values to the other. The impulses obtained on the secondary thus obtain a time integral which always is constant and only depends on the characteristics of the core material as long as the input impulses have enough amplitude and duration for completely re-magnetizing the core. The secondary winding of the transformer T*k* is via the rectifier $L_s$ connected to the register coil DM, the core and the number of winding turns of which are so dimensioned that the core of the coil cannot be completely re-magnetized by the maximal number of impulses. The rectifier $L_s$ is connected so that only pulses of the one polarity can actuate the coil. Between the register coil DM and the transformer T*k* there is also connected a make contact *k*4 of an impulse series relay IR which is slow releasing and remains operated as long as the impulse series lasts.

The device for reading the register coil consists principally of reading coils D1—D*n*, equipped with saturable iron cores the number of coils being equal to the maximum number of impulses in any impulse series. The number of winding turns of the reading coils is such, that their cores each are re-magnetized for a voltage integral corresponding to a certain number of impulses stored in the register coil. If the same voltage is applied to these reading coils as to the register coil DM the core of the reading coil D1 is thus re-magnetized from —B*r* to +B*r* (Fig. 1) within the same time required to magnetize the core of the register coil DM from —B*r* to *a*, while the core in the coil D2 (not shown) is re-magnetized from —Br to +B*r* within the same time required to magnetize the core of the register coil DM from —B*r* to *b* and so on. Each reading coil D1—D*n* in the reading equipment is associated with a glow discharge tube G1 to G*n* with pertaining marking relays R1—R*n* for indicating the time when the respective choke coil is entirely re-magnetized. A number of rectifiers L1—L*n*, L*a*1—L*an* and LH1—LH*n* are connected to reading coils D1—D*n*, one for each coil, said rectifiers controlling the currents to the respective coils. The glow discharge tube GR and the rectifier LR stop the magnetization of the reading coils D1—D*n* after the reading has been completed.

The arrangement according to Fig. 2 operates in the following way. When the impulse counting is to start the busy contact *k*1 is closed in a known manner, and the positive potential is connected to the movable contact arm of the impulse relay contact K2. Thus a current is obtained from plus via the lower fixed contact of the contact *k*2, the primary winding of transformer T*k*, the current limiting resistance *rb*, the lower fixed contact of the contact *k*3 to minus. On the secondary side of transformer T*k* a positive current impulse is obtained which, however, is prevented from reaching the register coil DM as the contact *k*4 on the impulse series relay IR is open. The impulse series which is to be counted, actuates the impulse contacts *k*2 and *k*3 causing a change in the polarity of the voltage which is applied to the primary winding at transformer T*k*. At the same time as the impulse contacts change from the position shown in the figure, at the beginning of the impulse a contact *k*5 is also closed, which connects the impulse series relay IR. This relay is slow releasing and therefore it remains operated as long as the impulse series lasts. The impulse series relay IR closes the contact *k*4 which is connected between the secondary winding of the transformer T*k* and the register coil DM. For each polarity change at the impulse contacts *k*2 and *k*3 causing a positive impulse on the secondary of the transformer T*k*, that is to say the end of the impulses, a magnetizing current is thus obtained through the register coil DM which carries the magnetization one step from the initial value —B*r* (see Fig. 1) toward the value +B*r*. Owing to the quanting action of the transformer T*k* the magnetization steps, produced by the different impulses, have equal size and they are within certain limits independent of amplitude and length of the impulses obtained from the impulse contacts *k*2, *k*3.

When the impulse series is finished the impluse relay IR opens and disconnects the contact *k*4, and as soon as the reading equipment is disengaged the contacts *k*6, *k*7 and *k*8 are closed, and a current path is closed from the positive terminal +E1 of a source of reading voltage via the contact *k*8, the resistance *ra*, the rectifier LR, the contact *k*7, the register coil DM, the contact *k*6 and the primary winding of the transformer TR to the zero potential. Now the counting coil begins to be magnetized back from the state, e.g. *c*, corresponding to the number of stored impulses in reference to the initial state —B*r*. At the same time the voltage +E1 is also connected via the resistance *ra* to all the reading coils D1—D*n* in parallel. The voltage is applied via the rectifiers L1—L*n* to the upper terminals of the coils and a magnetization current flows through all the reading coils, seeking to carry the magnetization state of their cores to the upper saturation value. As mentioned earlier the coils D1—D*n* have different number of turns and thus the re-magnetization requires different lengths of times for different coils, viz. $1/n$, $2/n$ . . . $n/n$ of the magnetization time of the register coil DM from the value, corresponding to impulses to the output value. The lower terminal of the reading coil D1 is connected first via the primary winding of the transformer to the cathode of the discharge tube G1 and then to the joint between the rectifier LH1 and the resistance *r*1 connected to a minus potential. Normally a current is flowing from zero via the rectifier LH1 and the resistance *r*1 to minus which is greater than the current flowing through the reading coil D1 as long as the core is not saturated. Thus the lower end of the reading coil D1 will be kept on zero potential as long as the re-magnetization is proceeding. As soon as the core of the reading coil D1 is magnetized to saturation the current through this coil increases stepwise to a value which is much higher than normal causing the rectifier LH1 to be blocked, and a current impulse flows through the primary winding of the transformer T1 and the relay winding R1 to zero. The voltage increase obtained through the secondary winding of the transformer T1 is applied to the starter electrode of the glow discharge tube G1 which fires. The potential of the cathode of the glow discharge tube increases so much that the rectifier L1 is blocked and any futher current cannot flow through the reading coil D1. The relay R1 operates and indicates that at least one impulse is stored in the register coil DM.

In the same manner the re-magnetization of further reading coils D2—D*n* continues until the magnetization of the register coil DM is brought back to the lower saturation value. If one assumes for instance suppose that three impulses are stored in the register coil DM, three reading coils D1, D2 and D3 are re-magnetized and the associated relays R1, R2, R3 are operated when the register coil reached the negative saturation value $-Br$. As soon as this value is reached the current increases greatly through the register coil DM. The rectifier LHR, which normally is conductive and shunts the primary winding of the transformer TR is blocked, and the current increases thus obtained through the primary winding is inducing a voltage impulse through the secondary winding which impulses fires the glow discharge tube GR. The anode of this glow discharge tube is connected to the voltage source $+E1$ via the resistance *ra* while the cathode is connected to a negative voltage. When the main distance of the tube is fired a potential drop is obtained over the resistance *ra* such that the anode potential decreases below zero and the rectifier LR is blocked, the current through the not re-magnetized reading coils D4—D*n* stops due to the blocking of the rectifiers L4—L*n* so that further reading is stopped. The count of the number of impulses stored in the counting coil is now represented by the last operated relay, that is, relay R3 in the chosen example.

The register coil is now ready for a new registration which can take place as soon as the contacts *k*6 and *k*7 are disconnected.

When the count read by the reading equipment is transferred to the device, e.g. a marker, which is to use the recorded information, the reading equipment is disengaged and set zero by changing the movable contact *k*9 from plus to minus. The glow discharge tubes G1—G*n* are extinguished and a current will be flowing from zero through respective rectifiers LH1, LH*n*, the reading coils D1—D*n*, the rectifiers L*a*1—L*an* to minus, restoring the reading coils to the negative saturation value—B*r*. At the same time the gas discharge tube GR has also been extinguished by disconnecting the anode voltage by breaking the contact *k*8. As soon as the reading coils are remagnetized, the contact *k*9 returns to the lower position and the reading equipment is ready for a new operation.

The invention is of course not restricted to the shown embodiment but can be varied within the scope of invention. It is e.g. possible to "fill" the counting coil to the upper saturation value instead of returning its magnetiziation to the lower saturation valve at reading. With the same reading equipment as the shown arrangement the number of not re-magnetized reading coils will represent the number of registered impulses.

Further it is obvious that a reading equipment operating according to the same principle can be designed using other bistable elements than cold cathode tubes, e.g. thyratron tubes or certain types of transistors, as so called point transistors and the lately developed so called "avalanche-breakdown-transistors." It is also possible to design bistable devices by using known combinations of two or several normal vacuum tubes or transistors which devices can replace the gas discharge tubes in the arrangement according to the invention.

I claim:

1. In a magnetic register circuit, a storage portion comprising at least one storage coil having a core of a magnetic material with a substantially rectangular hysteresis loop and saturable to two saturation states, means for feeding a pulse train to be counted to each of said coils, the individual pulses in said pulse trains having the same voltage-time integral, the voltage time capacity of said core from one remanence point to the other being at least equal to the greatest number of pulses to be counted, a read-out portion, means for connecting said storage coils to the read-out portion, said read-out portion including at least as many reading coils having cores of a material with a substantially rectangular hysteresis loop and saturable to two saturation states as the maximum number of pulses in said pulse trains, said reading coil cores being initially saturated in one direction and the voltage-time capacity of said cores being unequal and equal to $$\frac{m}{n}$$

times the voltage-time integral of the individual pulses fed to said storage coil, where $m$ is the ordinal number of the reading coil and $n$ is the total number of reading coils, circuit means for connecting said reading coils and said storage coil in parallel to a common D.C. source, means disconnecting said D.C. source when the core of the storage coil has obtained either saturation state, and means indicating the cores of the reading coils which have changed their saturation state.

2. A magnetic register as claimed in claim 1 wherein the winding direction of the storage coil is such that the D.C. source, when connected, is restoring the magnetic state of the coil to the state prior to the pulse storage.

3. A magnetic register as claimed in claim 1 wherein the winding direction of the storage coil is such that the D.C. source, when connected, is forcing the magnetic state of the coil to the saturation state opposite to the state prior to the pulse storage.

References Cited in the file of this patent

UNITED STATES PATENTS

| | | |
|---|---|---|
| 2,721,947 | Isborn | Oct. 25, 1955 |
| 2,805,408 | Hamilton | Sept. 3, 1957 |

OTHER REFERENCES

An article "A Magnetic Scaling Circuit," pp. 107, 108, Journal of Applied Physics, vol. 22, January 1951.